(12) United States Patent
Mizokane et al.

(10) Patent No.: US 11,590,912 B2
(45) Date of Patent: Feb. 28, 2023

(54) FRONT VEHICLE-BODY STRUCTURE OF VEHICLE

(71) Applicant: MAZDA MOTOR CORPORATION, Hiroshima (JP)

(72) Inventors: Michiya Mizokane, Aki-gun (JP); Yuki Ikawa, Aki-gun (JP); Masayoshi Enomoto, Aki-gun (JP); Yoshiatsu Kuga, Aki-gun (JP); Satoshi Okamoto, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 154 days.

(21) Appl. No.: 17/193,526

(22) Filed: Mar. 5, 2021

(65) Prior Publication Data
US 2021/0309175 A1  Oct. 7, 2021

(30) Foreign Application Priority Data

Apr. 2, 2020 (JP) .............................. JP2020-066356

(51) Int. Cl.
*B60R 19/52* (2006.01)
*B60R 19/02* (2006.01)
*B62D 35/00* (2006.01)

(52) U.S. Cl.
CPC ............ *B60R 19/52* (2013.01); *B60R 19/023* (2013.01); *B62D 35/00* (2013.01); *B60R 2019/527* (2013.01)

(58) Field of Classification Search
CPC . B60R 19/52; B60R 19/023; B60R 2019/527; B62D 35/00
See application file for complete search history.

(56) References Cited

FOREIGN PATENT DOCUMENTS

JP  2009220659 A  * 10/2009
JP  6313240 B2  4/2018

* cited by examiner

*Primary Examiner* — D Glenn Dayoan
*Assistant Examiner* — Melissa Ann Bonifazi
(74) *Attorney, Agent, or Firm* — Studebaker & Brackett PC

(57) ABSTRACT

A front vehicle-body structure flows air from the vehicle lower side to its upper side. After hitting a front bumper face, the air is separated and flows around and along a top face of an exterior member, ensuring aerodynamic performance. Embodiments include exterior members covering the upper side of an engine room, and a front grille disposed on a lower side relative to a front end portion of the exterior member. A rectification member extends the width of the exterior member in the vehicle width direction on the lower side of the exterior member front end portion. The rectification member includes a front piece portion extending toward the vehicle up-down-direction lower side from the exterior member to an upper end portion of the front grille, and a lower piece portion extending toward the vehicle rear side from an upper end portion of the front piece portion.

6 Claims, 6 Drawing Sheets

FRONT VEHICLE-BODY STRUCTURE OF VEHICLE

TECHNICAL FIELD

The present disclosure relates to a front vehicle-body structure of a vehicle which includes an exterior member covering the upper side of an engine room, and a front grille disposed on the front lower side of the exterior member in a vehicle front portion.

BACKGROUND

A cross-sectional shape of a bumper face has been conventionally known which allows air (traveling air) hitting a vehicle front portion to flow along the bumper face (see, Japanese Patent No. 6313240). For example, in a conventional structure disclosed in Japanese Patent No. 6313240, a front under grille is provided at a vehicle-width-direction center of a bumper face, and an upper portion of the front under grille includes a protrusion protruding toward the vehicle front side. The protrusion is provided with a first inclined face inclined rearward and upward and a second inclined face inclined rearward and downward, and the front-rear length of the first inclined face is provided to be longer than the front-rear length of the second inclined face. This makes it easier for a vehicle front portion to be pressed downward during traveling of the vehicle, thereby attempting to improve traveling stability.

Meanwhile, it is preferable that traveling air flowing from the vehicle front side hits the bumper face and then flows from the vehicle lower side to the vehicle upper side below an exterior member such as a bonnet and a bumper face upper so that air separated at a front end lower portion of the exterior member flows along a top face of the bonnet; however, when designability of the vehicle is emphasized, the air separated at the front end lower portion of the exterior member is excessively separated above the front end of the exterior member, and traveling air after separation cannot flow along the top face of the bonnet, which leads to a problem of deterioration of air resistance.

SUMMARY

Thus, the present disclosure provides a front vehicle-body structure of a vehicle in which traveling air flowing from the vehicle lower side to the vehicle upper side is, after hitting a bumper face, separated at a vehicle front end, and the traveling air after separation goes around a top face of an exterior member, so that the traveling air flows along the top face of the exterior member, thereby ensuring aerodynamic performance.

A front vehicle-body structure of a vehicle according to the present disclosure is a front vehicle-body structure of a vehicle which includes an exterior member covering the upper side of an engine room provided in a vehicle front portion, and a front grille disposed on the vehicle up-down-direction lower side relative to a front end portion of the exterior member, wherein a rectification member extending over substantially the full width of the exterior member in the vehicle width direction is provided on the lower side of the front end portion of the exterior member, and a front piece portion extending toward the vehicle up-down-direction lower side from the exterior member to an upper end portion of the front grille and a lower piece portion extending toward the vehicle rear side from an upper end of the front piece portion are disposed in the rectification member.

The above-described exterior member can be attached to a bumper face upper and a bonnet. According to this configuration, after traveling air flowing from the vehicle front side hits a bumper face, a flow of traveling air directed from the vehicle lower side to the vehicle upper side below a lower end of the exterior member is separated by hitting a lower end of the front piece portion of the rectification member and goes around a top face of the exterior member, so that the traveling air can flow along the top face of the exterior member. Thus, aerodynamic performance can be ensured.

In an embodiment of the present disclosure, a lower end position of the rectification member is located on the vehicle lower side by a predetermined distance from a front end position of the top face of the exterior member, and the predetermined distance is set in a range of equal to or more than 15 mm and equal to or less than 30 mm. According to this configuration, the above-described predetermined distance is within the range of 15 to 30 mm, so that a flow of traveling air separated by hitting a separation portion of the lower end of the rectification member reliably goes around the top face of the exterior member, and the traveling air can reliably flow along the top face of the exterior member.

When the predetermined distance is less than 15 mm, traveling air is excessively separated above a front end of the exterior member, and the traveling air no longer flows along the top face of the exterior member, which is thus not preferable. Conversely, when the predetermined distance exceeds 30 mm, traveling air separated by the separation portion hits a face on the front end side of the exterior member, and the traveling air no longer flows along the top face of the exterior member, which is thus not preferable.

In another embodiment of the present disclosure, a front end of the rectification member is located on the vehicle front side relative to the front end of the exterior member. According to this configuration, traveling air is separated on the front side relative to the front end of the exterior member, so that traveling air after separation easily flows along an inclination of the top face of the exterior member.

In a further embodiment of the present disclosure, the front end portion of the exterior member includes a bottom face portion of the exterior member which extends toward the vehicle rear side, and the rectification member includes a holding portion configured to hold the bottom face portion in the vehicle up-down direction so that the bottom face portion can be mounted on the holding portion. According to this configuration, the following effect is provided. That is, when traveling air hits a front portion of the rectification member, a force in a direction of lowering the bottom face portion of the exterior member downward acts on the rectification member, so that the exterior member can be prevented from being released during traveling of the vehicle.

According to the present disclosure, an effect is provided in which traveling air flowing from the vehicle lower side to the vehicle upper side is, after hitting the bumper face, separated at a vehicle front end, and the traveling air after separation goes around the top face of the exterior member, so that the traveling air flows along the top face of the exterior member, thereby ensuring aerodynamic performance.

DETAILED DESCRIPTION

The goal that traveling air flowing from the vehicle lower side to the vehicle upper side is separated at a vehicle front end after hitting a bumper face, and the traveling air after separation goes around a top face of an exterior member, so that the traveling air flows along the top face of the exterior member, thereby ensuring aerodynamic performance, is realized by a configuration of a front vehicle-body structure of a vehicle which includes an exterior member covering the upper side of an engine room provided in a vehicle front portion, and a front grille disposed on the vehicle up-down-direction lower side relative to a front end portion of the exterior member, wherein a rectification member extending over substantially the full width of the exterior member in the vehicle width direction is provided on the lower side of the front end portion of the exterior member, and a front piece portion extending toward the vehicle up-down-direction lower side from the exterior member to an upper end portion of the front grille and a lower piece portion extending toward the vehicle rear side from an upper end of the front piece portion are disposed in the rectification member.

Figure 1:
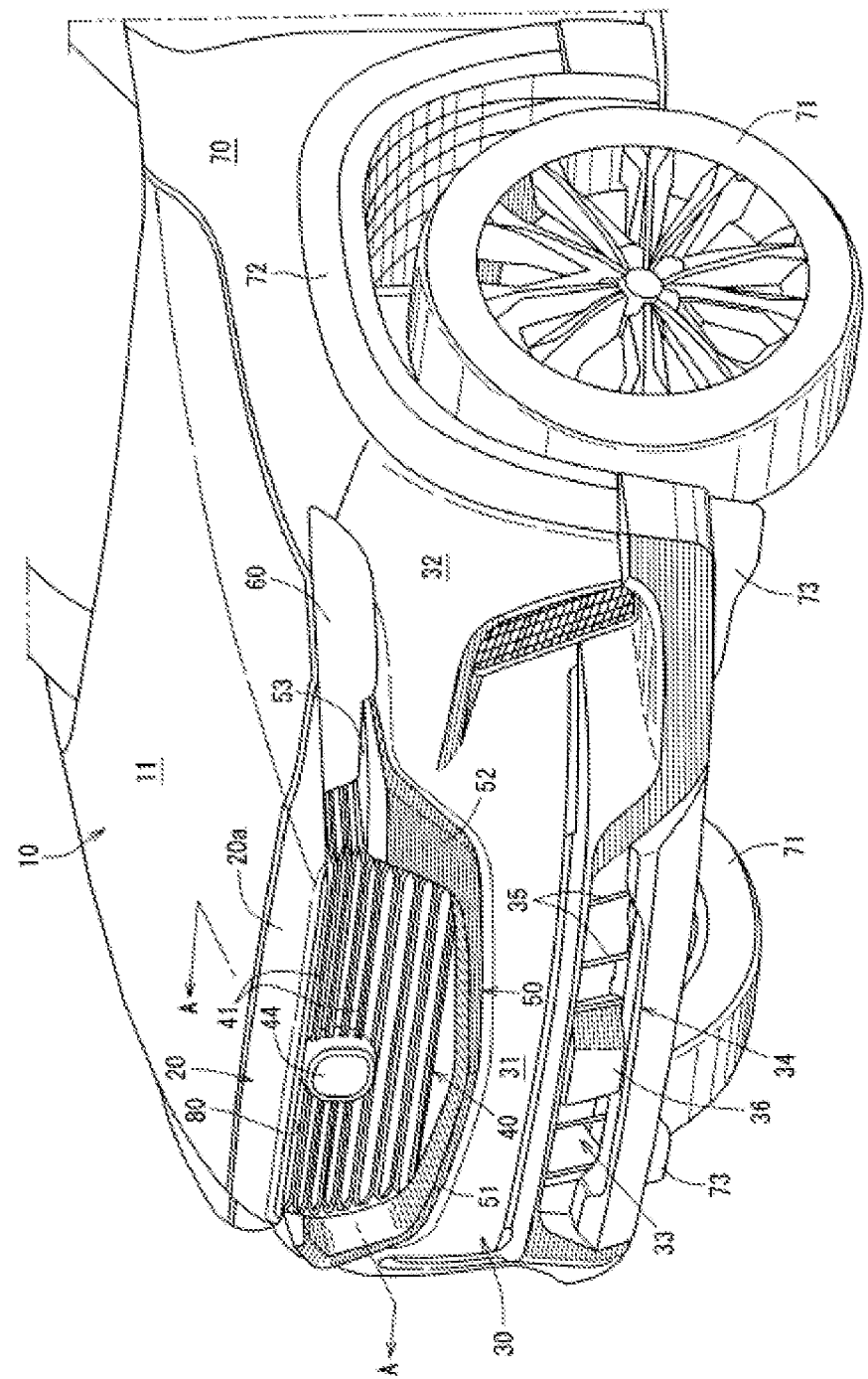
FIG. 1 is a perspective view illustrating a front vehicle-body structure of a vehicle of the present disclosure.
Figure 2:
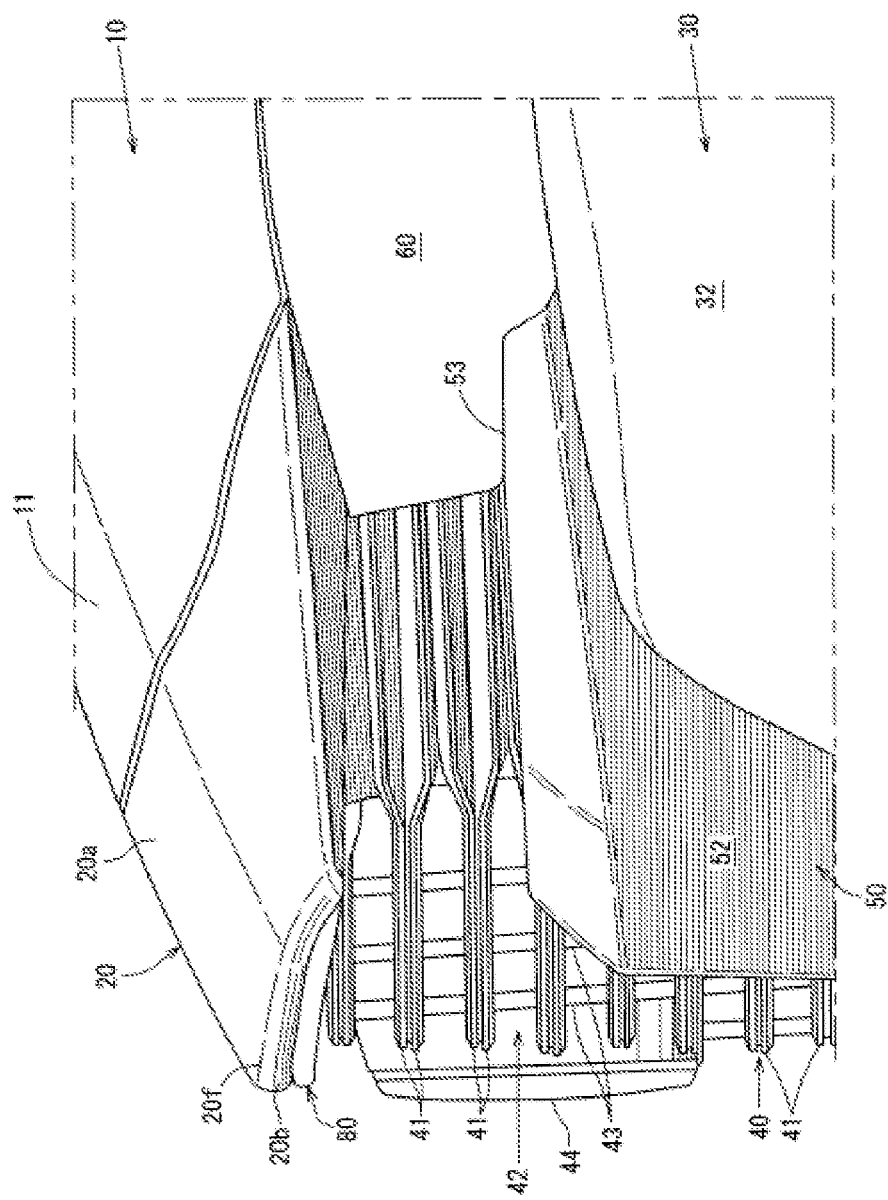
FIG. 2 is a side view of FIG. 1 on the vehicle left side.
Figure 3:
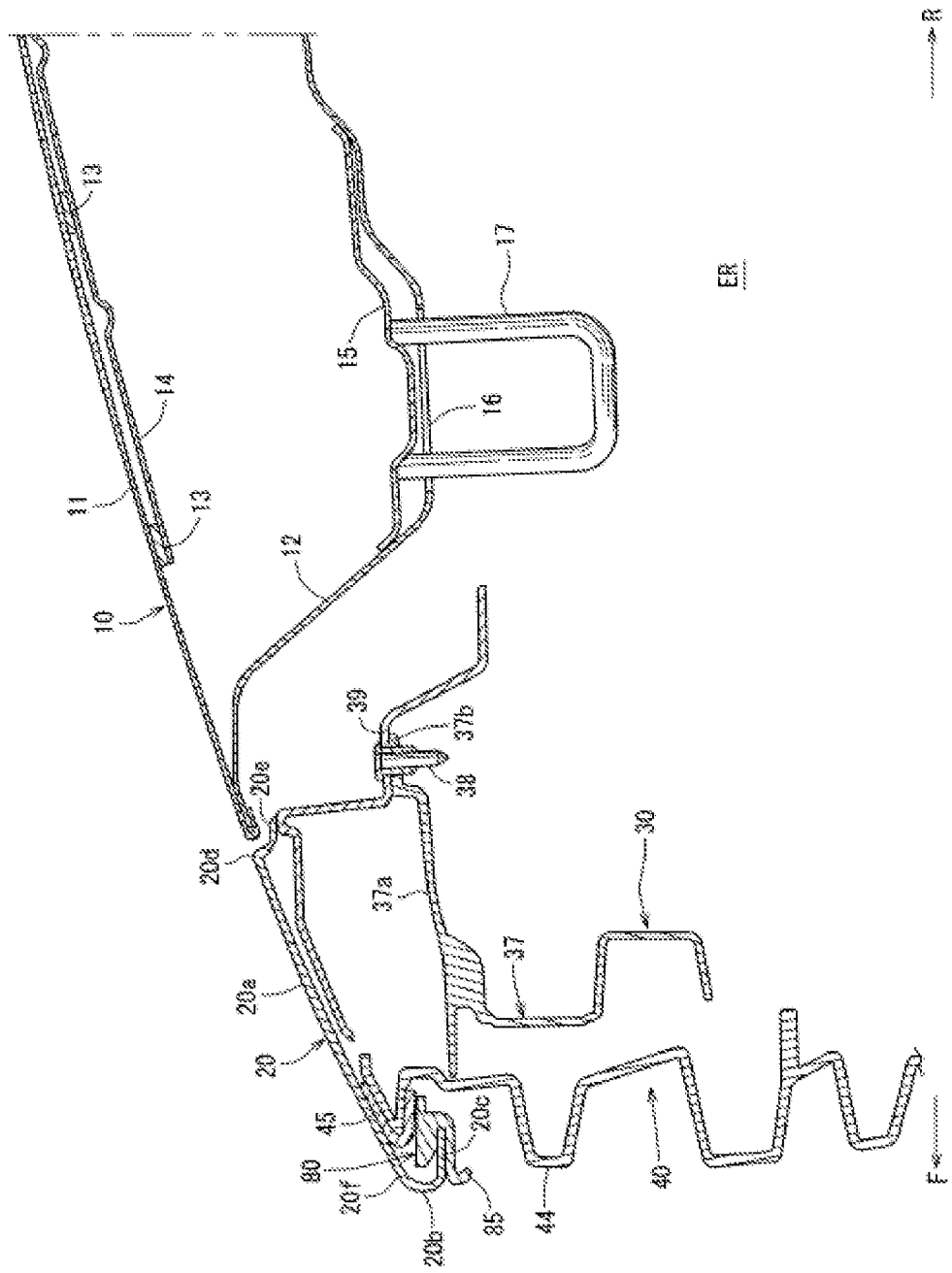
FIG. 3 is a cross-sectional view taken along line A-A of FIG. 1.
Figure 4A:
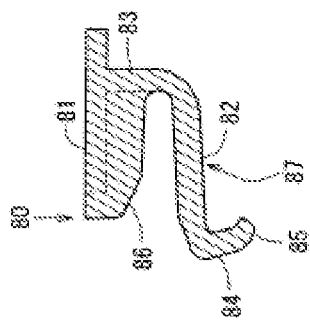
FIG. 4A is an enlarged cross-sectional view of a rectification member.
Figure 4B:
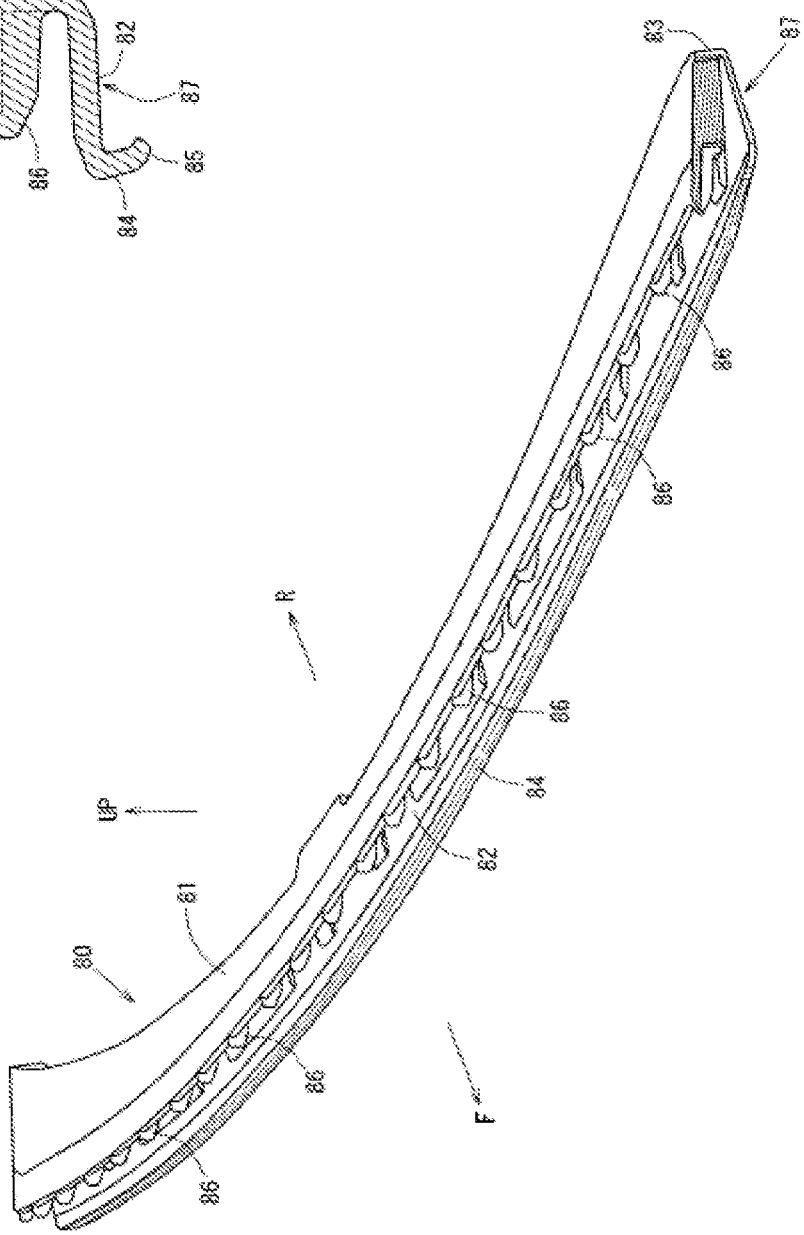
FIG. 4B is a perspective view of the rectification member.
Figure 5A:
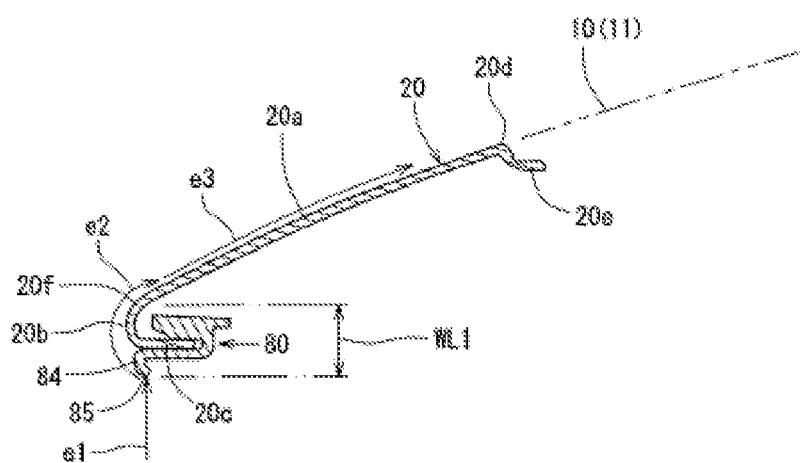
FIG. 5A is an explanatory view illustrating a flow of traveling air after separation in Embodiment 1.

An embodiment of the present disclosure will be described in detail based on the following drawings. The drawings illustrate a front vehicle-body structure of a vehicle, in which FIG. 1 is a perspective view illustrating the front vehicle-body structure of a vehicle, FIG. 2 is a side view of FIG. 1 on the vehicle left side, FIG. 3 is a cross-sectional view taken along line A-A of FIG. 1, FIG. 4A is an enlarged cross-sectional view of a rectification member, and FIG. 4B is a perspective view of the rectification member. Furthermore, FIG. 5A is an explanatory view illustrating a flow of traveling air after separation in Embodiment 1. In the figures, arrow (F) indicates the vehicle front side; arrow (R), the vehicle rear side; arrow (UP), the vehicle upper side.

As illustrated in FIGS. 1 and 3, a bonnet 10 (rear exterior member) and a bumper face upper 20 (front exterior member) as exterior members covering the upper side of an engine room ER are provided. Furthermore, the front side of the above-described engine room ER is covered by a bumper face 30 forming a vehicle front face and a front grille 40 having a lattice structure. The above-described front grille 40 is disposed on the front lower side of the bumper face upper 20 in a vehicle front portion. Specifically, the front grille 40 is disposed between the bumper face 30 and the bumper face upper 20. Also provided is a signature wing 50 as a decorative member provided from the lower side of the above-described front grille 40 to up-down-direction intermediate portions of both left and right side portions of the front grille 40.

Furthermore, a headlamp unit 60 is provided on the vehicle rear side relative to a front end of the above-described front grille 40 and on the vehicle-width-direction outer side of the front grille 40. Both left and right sides of the above-described engine room ER are covered by front fender panels 70. Note that in the drawing, only the front fender panel 70 on the vehicle left side is illustrated for convenience of illustration.

As illustrated in FIG. 3, the above-described bonnet 10 is formed by integrating a bonnet outer 11 located on the vehicle upper side and a bonnet inner 12 located on the lower side of the bonnet outer 11 by hemming. As illustrated in the same figure, a bonnet reinforcement 14 is bonded and fixed to a bottom face of the bonnet outer 11 by using an adhesive 13, and this bonnet reinforcement 14 secures tensile rigidity of the bonnet outer 11.

A striker bracket 15 is fixed to a front inner face of the bonnet inner 12, and this striker bracket 15 is provided with a striker 17 protruding downward from an opening 16 of the bonnet inner 12. The above-described striker 17 is engaged by a latch device on the vehicle body side. In the above-described bonnet 10, the rear end side of the bonnet 10 is mounted on the vehicle body side by a bonnet hinge, and the front end side of the bonnet 10 is configured so as to open and close.

As illustrated in FIGS. 1 and 3, the above-described bumper face upper 20 extends in the vehicle width direction up to longitudinal-direction intermediate portions of top faces of the pair of left and right headlamp units 60. As illustrated in FIG. 3, this bumper face upper 20 includes a top face portion 20a inclined in a front-low rear-high shape, a front face portion 20b having a curved shape and extending downward from a front end position 20f of this top face portion 20a, and a bottom face portion 20c extending toward the vehicle rear side from a lower end of this front face portion 20b. Furthermore, as illustrated in FIG. 3, a rear end position 20d of the top face portion 20a of the above-described bumper face upper 20 is integrally formed with a step-down portion 20e formed to be stepped down below.

As illustrated in FIG. 3, the top face portion 20a of the bumper face upper 20 and a top face of the bonnet outer 11 of the bonnet 10 are smoothly continuous in the vehicle front-rear direction in an inclined shape in which the vehicle front side is low and the vehicle rear side is high. As illustrated in FIG. 1, the above-described bumper face 30 includes a main face portion 31 forming the vehicle front face and a round portion 32 going around to a front end of the front fender panel 70 in a vehicle-width-direction side portion of this main face portion 31. Furthermore, as illustrated in the same figure, a lower grille 34 forming an outside air introduction port 33 is formed in a lower portion of the bumper face 30. This lower grille 34 includes a plurality of vertical crosspieces 35 extending in the up-down direction and a license plate mounting portion 36.

As illustrated in FIGS. 1 and 3, in the above-described bumper face 30, a portion corresponding to the front grille 40 from an upper end of the main face portion 31 is integrally formed with a receding portion 37 located on the vehicle rear side of the front grille 40. As illustrated in FIG. 3, a center bracket 39 is mounted on a rear end 37b of an upper piece portion 37a of the above-described receding portion 37 by using a mounting member 38.

As illustrated in FIGS. 1 and 2, in the above-described front grille 40, a plurality of sets of a pair of transverse crosspieces 41 adjacent to each other in the up-down direction and extending in the vehicle width direction are provided so as to be spaced apart from each other in the vehicle up-down direction, and an outside air introduction port 42 is formed between a set of the pair of transverse crosspieces 41 on the upper side and a set of the pair of transverse crosspieces 41 on the lower side.

As illustrated in FIG. 2, the above-described front grille 40 has a vertical crosspiece 43 coupling the transverse crosspieces 41 on the upper and lower sides in the up-down direction, and a vehicle-width-direction center upper portion of the front grille 40 is provided with an emblem 44. As illustrated in FIG. 3, a rubber seal 45 is provided between an upper end of the above-described front grille 40 and a bottom face of the top face portion 20a of the bumper face upper 20.

As illustrated in FIG. 1, the above-described signature wing 50 includes a front face portion 51 located between the main face portion 31 of the bumper face 30 and a lower portion of the front grille 40 and extending in the vehicle width direction, and a side face portion 52 extending upward from a vehicle-width-direction end portion of this front face portion 51 to the middle of the side portion of the front grille 40 in the up-down direction. This side face portion 52 is formed in a tapered shape in which the dimension in the vehicle width direction on the vehicle lower side is relatively small and the dimension in the vehicle width direction on the vehicle upper side is relatively large. As also illustrated in FIG. 1, the above-described signature wing 50 includes a top face portion 53 substantially horizontally extending toward the vehicle rear side from an upper end of the side face portion 52 to a vehicle-width-direction inner-side front face of the headlamp unit 60.

As illustrated in FIG. 1, an end portion of the round portion 32 of the bumper face 30 and an end portion of the front fender panel 70 which face to a front wheel 71 are provided with an over fender 72 continuous with each of these members. Furthermore, as illustrated in FIG. 1, in order to improve aerodynamic performance, the lower portion of the bumper face 30 in a forward portion of the front wheel 71 is provided with a deflector (a so-called baffle plate) 73 facing to the front wheel 71.

As illustrated in FIGS. 1, 2, and 3, a lower portion of the bumper face upper 20 as the exterior member is provided with a rectification member 80 (a so-called nose blade) extending over substantially the full width of the bumper face upper 20 in the vehicle width direction.

As illustrated in FIGS. 3, 4A, and 4B, the above-described rectification member 80 is formed by integrating, by means of synthetic resin, an upper piece portion 81 extending in the vehicle width direction, a lower piece portion 82 extending in the vehicle width direction below this upper piece portion 81, and a rear piece portion 83 coupling rear end portions of the upper piece portion 81 and the lower piece portion 82 in the up-down direction and extending in the vehicle width direction.

As illustrated in FIGS. 3 and 4A-B, a front end of the lower piece portion 82 of the above-described rectification member 80 is integrally formed with a front piece portion 84 extending downward from the front end so as to extend in the vehicle width direction, and a separation portion 85 that separates traveling air is formed at a lower end of this front piece portion 84. That is, as illustrated in FIG. 3, a front end of the above-described rectification member 80 extends downward from the bumper face upper 20 serving as the exterior member (see, in particular, the front end position 20f thereof), and the separation portion 85 that separates traveling air is formed at a lower end of the rectification member 80.

Thus, as illustrated in FIG. 5A, after traveling air flowing from the vehicle front side hits the bumper face 30, a flow e1 of traveling air directed from the vehicle lower side to the vehicle upper side below a lower end of the bumper face upper 20 is separated by hitting the separation portion 85. An air e2 separated by the separation portion 85 goes around the top face portion 20a of the bumper face upper 20, and an air e3 after re-contact to the top face portion 20a of the bumper face upper 20 flows to the vehicle rear side along the top face portion 20a and the top face of the bonnet outer 11 of the bonnet 10. Thus, such a configuration ensures the aerodynamic performance.

As illustrated in FIGS. 4A and 4B, a rib 86 for reinforcement is integrally formed from a front end face of the upper piece portion 81 of the above-described rectification member 80 to a bottom face thereof. As illustrated in the same figures, a plurality of the ribs 86 are provided so as to be spaced apart from each other at predetermined intervals in the vehicle width direction of the upper piece portion 81.

As illustrated in FIGS. 3 and 4A-B, the above-described rectification member 80 is mounted so as to hold the bottom face portion 20c of the bumper face upper 20 as the exterior member in the vehicle up-down direction. In this embodiment, the bottom face portion 20c of the bumper face upper 20 is mounted so as to be held between bottom faces of the plurality of ribs 86 of the rectification member 80 and a top face of the lower piece portion 82 from the vehicle up-down direction. That is, a front end portion of the bumper face upper 20 includes the bottom face portion 20c (see FIGS. 5A-B) extending toward the vehicle rear side, and the rectification member 80 includes a holding portion 87 (see FIGS. 4A-B) that holds the bottom face portion 20c in the vehicle up-down direction so that the bottom face portion 20c can be mounted on the holding portion 87.

Thus, in such a configuration, when traveling air hits the front piece portion 84 of the rectification member 80, a force in a direction of pressing the front piece portion 84 downward acts, and thereby a force in a direction of lowering the bottom face portion 20c of the bumper face upper 20 downward acts on the rectification member 80, so that the bumper face upper 20 is prevented from being released during traveling of the vehicle.

Figure 5B:
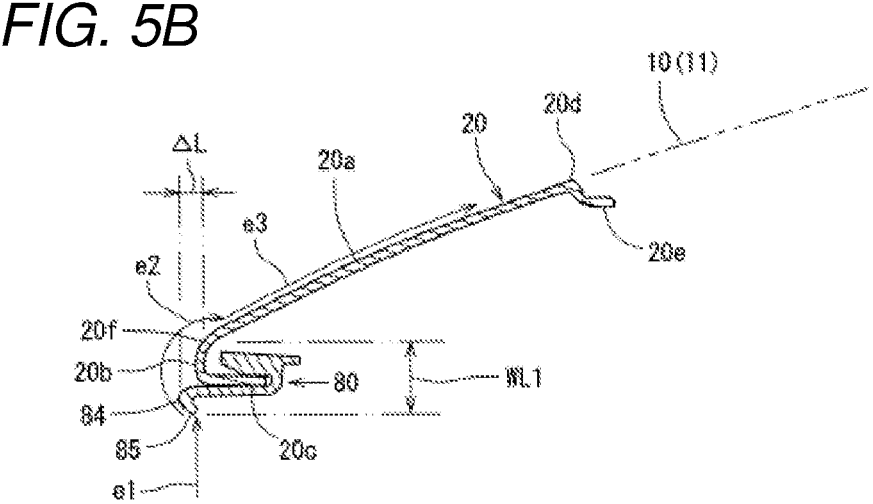
FIG. 5B is an explanatory view illustrating a flow of traveling air after separation in Embodiment 2.
Figure 6A:
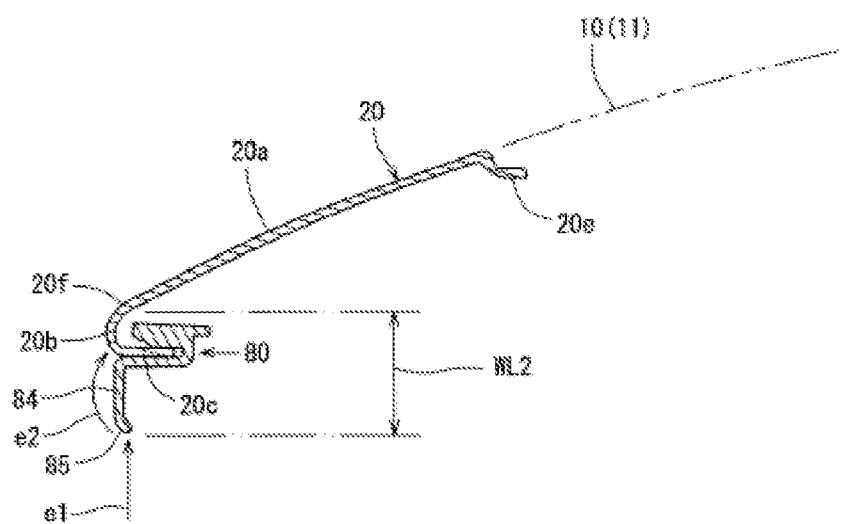
FIG. 6A is an explanatory view illustrating a flow of traveling air after separation in a comparative example.
Figure 6B:
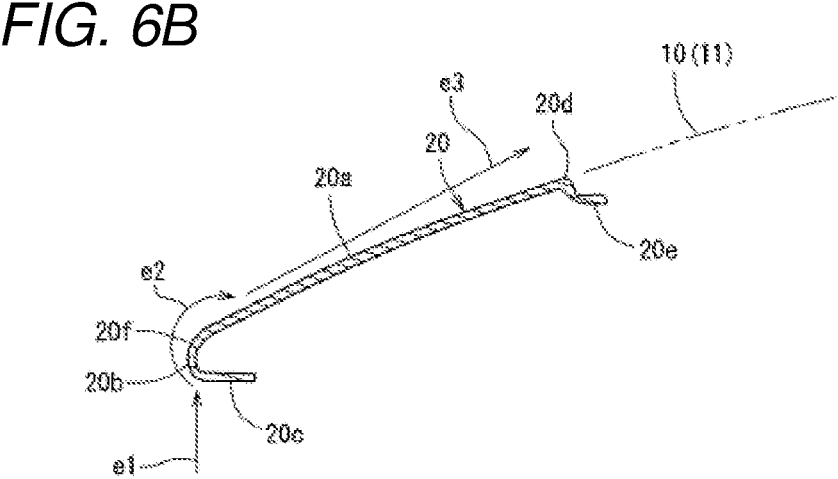
FIG. 6B is an explanatory view illustrating a flow of traveling air after separation in a conventional example.

FIG. 5A is an explanatory view illustrating a flow of traveling air after separation in Embodiment 1, and FIG. 5B is an explanatory view illustrating a flow of traveling air after separation in Embodiment 2. Furthermore, FIG. 6A is an explanatory view illustrating a flow of traveling air after separation in a comparative example, and FIG. 6B is an explanatory view illustrating a flow of traveling air after separation in a conventional example. In FIGS. 5A-B and 6A-B, the same parts as those of the embodiment illustrated in FIGS. 1 to 4B are denoted by the same reference signs, for convenience of explanation.

In Embodiment 1 illustrated in FIG. 5A, a lower end position of the rectification member 80, namely, a position of the separation portion 85, is located on the vehicle lower side by a predetermined distance WL1 from the front end position 20f of a top face of the bumper face upper 20, and this predetermined distance WL1 is set in a range of equal to or more than 15 mm and equal to or less than 30 mm. The above-described predetermined distance WL1 is within the range of 15 to 30 mm, so that, as described already, the flow e2 of the traveling air separated by hitting the separation portion 85 of the lower end of the rectification member 80 reliably goes around the top face portion 20a of the bumper face upper 20, and the traveling air e3 after re-contact can reliably flow along the top faces of the bumper face upper 20 and the bonnet outer 11.

In Embodiment 2 illustrated in FIG. 5B, the predetermined distance WL1 is set within the range of 15 to 30 mm, and the front end of the above-described rectification member 80 is located on the vehicle front side by a predetermined amount ΔL relative to the front end position 20f of the bumper face upper 20. In this Embodiment 2, as illustrated in FIG. 5(b), the flow e1 of the traveling air directed from the vehicle lower side to the vehicle upper side can be separated on the vehicle front side relative to the front end position 20f of the bumper face upper 20, and thus the traveling air e2 after separation can re-contact on the vehicle front side relative to a re-contact point of Embodiment 1 illustrated in FIG. 5A. As a result, the traveling air e3 after re-contact easily flows to the vehicle rear side along inclinations of the top faces of the bumper face upper 20 and the bonnet outer 11.

In the comparative example illustrated in FIG. 6A, the lower end position of the rectification member 80, namely, the position of the separation portion 85, is located on the vehicle lower side by a predetermined distance WL2 (note that WL2>WL1) from the front end position 20f of the top face of the bumper face upper 20, and this predetermined distance WL2 is set so as to exceed 30 mm. In this case, as illustrated in FIG. 6A, the traveling air e2 separated by the separation portion 85 hits the front face portion 20b of the bumper face upper 20, and the traveling air e2 no longer flows along the top face portion 20a of the bumper face upper 20, which is thus not preferable.

On the other hand, in the conventional example illustrated in FIG. 6B, the rectification member 80 does not exist. That is, the predetermined distances WL1 and WL2 are set to zero. In this case, as illustrated in FIG. 6B, the traveling air e2 is excessively largely separated above a front end of the bumper face upper 20, and good re-contact cannot be obtained, so that the subsequent traveling air e3 no longer flows along the top faces of the bumper face upper 20 and the bonnet outer 11, which is thus not preferable.

The case where the predetermined distance WL2 exceeds 30 mm is equivalent to the comparative example of FIG. 6A, and the case where the predetermined distance WL1 is less than 15 mm is equivalent to the conventional example of FIG. 6B, which are both not preferable; accordingly, the predetermined distance WL1 is set within the range of 15 to 30 mm.

Thus, the front vehicle-body structure of a vehicle in this embodiment is a front vehicle-body structure of a vehicle which includes the exterior member (bonnet 10, bumper face upper 20) covering the upper side of the engine room ER provided in the vehicle front portion, and the front grille 40 disposed on the vehicle up-down-direction lower side relative to the front end portion of the exterior member, wherein the rectification member 80 extending over substantially the full width of the exterior member in the vehicle width direction is provided on the lower side of the front end portion of the exterior member (bumper face upper 20), and the front piece portion 84 extending toward the vehicle up-down-direction lower side from the exterior member to an upper end portion of the front grille 40 and the lower piece portion 82 extending toward the vehicle rear side from an upper end of the front piece portion 84 are formed in the rectification member 80 (see FIG. 3).

According to this configuration, after traveling air flowing from the vehicle front side hits the bumper face 30, the flow e1 of the traveling air directed from the vehicle lower side to the vehicle upper side below the lower end of the exterior member (bumper face upper 20) is separated by hitting the lower end of the front piece portion 84 of the rectification member and goes around the top face of the exterior member (bumper face upper 20), so that the traveling air e3 can flow along the top face of the exterior member (bumper face upper 20, bonnet outer 11). Thus, the aerodynamic performance can be ensured (see FIG. 5A).

Furthermore, in an embodiment of the present disclosure, the lower end position of the rectification member 80 is located on the vehicle lower side by the predetermined distance WL1 from the front end position 20f of the top face of the exterior member (bumper face upper 20), and the predetermined distance WL1 is set in the range of equal to or more than 15 mm and equal to or less than 30 mm (see FIG. 5A). According to this configuration, the above-described predetermined distance WL1 is within the range of 15 to 30 mm, so that the flow e2 of the traveling air separated by hitting the separation portion 85 of the lower end of the rectification member 80 reliably goes around the top face of the exterior member (bumper face upper 20), and the traveling air e3 can reliably flow along the top face of the exterior member (bumper face upper 20, bonnet outer 11).

When the predetermined distance is less than 15 mm, the traveling air e2 is excessively separated above the front end of the exterior member, and the subsequent traveling air e3 no longer flows along the top face of the exterior member, which is thus not preferable (see FIG. 6B). Conversely, when the predetermined distance WL2 exceeds 30 mm, the traveling air e2 separated by the separation portion 85 hits a face on the front end side of the exterior member, and the traveling air no longer flows along the top face of the exterior member, which is thus not preferable (see FIG. 6A).

Furthermore, in an embodiment of the present disclosure, the front end of the rectification member 80 is located on the vehicle front side relative to the front end (see the front end position 20l) of the exterior member (bumper face upper 20) (see FIG. 5B). According to this configuration, the traveling air e1 is separated on the front side relative to the front end of the exterior member (bumper face upper 20), so that the traveling air e3 after separation easily flows along the inclination of the top face of the exterior member (bumper face upper 20, bonnet outer 11).

Additionally, in an embodiment of the present disclosure, the front end portion of the exterior member (bumper face upper 20) includes the bottom face portion 20c of the exterior member which extends toward the vehicle rear side, and the rectification member 80 includes the holding portion 87 that holds the bottom face portion 20c in the vehicle up-down direction so that the bottom face portion 20c can be mounted on the holding portion 87 (see FIG. 3). According to this configuration, the following effect is provided. That is, when traveling air hits a front portion of the rectification member 80, the force in the direction of lowering the bottom face portion 20c of the exterior member (bumper face upper 20) downward acts on the rectification member 80, so that the exterior member (bumper face upper 20) can be prevented from being released during traveling of the vehicle.

Although in a correspondence between the configuration of the present disclosure and the above-described embodiment, the exterior member of the present disclosure corresponds to the bonnet 10 and the bumper face upper 20 in the embodiment, the present disclosure is not limited to only the configuration of the above-described embodiment.

As explained above, the present disclosure is useful for a front vehicle-body structure of a vehicle which includes an exterior member covering the upper side of an engine room, and a front grille disposed on the front lower side of the exterior member in a vehicle front portion.

What is claimed is:

1. A front vehicle-body structure of a vehicle, comprising:
   an exterior member covering an upper side of an engine room provided in a vehicle front portion; and
   a front grille disposed on a vehicle up-down-direction lower side relative to a front end portion of the exterior member,
   wherein a rectification member extending over substantially a full width of the exterior member in a vehicle width direction is disposed on a lower side of the front end portion of the exterior member,
   the rectification member includes a front piece portion extending toward the vehicle up-down-direction lower side from the exterior member to an upper end portion of the front grille, and a lower piece portion extending toward a vehicle rear side from an upper end of the front piece portion, and
   a front end of the rectification member extends downward from the exterior member, and a separation portion for separating traveling air is disposed at a lower end of the rectification member.

2. The front vehicle-body structure of a vehicle according to claim 1,
   wherein a lower end position of the rectification member is located on a vehicle lower side by a predetermined distance from a front end position of a top face of the exterior member, and
   the predetermined distance is set in a range of equal to or more than 15 mm and equal to or less than 30 mm.

3. The front vehicle-body structure of a vehicle according to claim 2,
   wherein the front end of the rectification member is located on a vehicle front side relative to a front end of the exterior member.

4. The front vehicle-body structure of a vehicle according to claim 3,
   wherein the front end portion of the exterior member comprises a bottom face portion of the exterior member, the bottom face portion extending toward the vehicle rear side, and
   the rectification member comprises a holding portion configured to hold the bottom face portion in a vehicle up-down direction so that the bottom face portion is mounted on the holding portion.

5. The front vehicle-body structure of a vehicle according to claim 1,
   wherein the front end portion of the exterior member comprises a bottom face portion of the exterior member, the bottom face portion extending toward the vehicle rear side, and
   the rectification member comprises a holding portion configured to hold the bottom face portion in a vehicle up-down direction so that the bottom face portion is mounted on the holding portion.

6. The front vehicle-body structure of a vehicle according to claim 2,
   wherein the front end portion of the exterior member comprises a bottom face portion of the exterior member, the bottom face portion extending toward the vehicle rear side, and
   the rectification member comprises a holding portion configured to hold the bottom face portion in a vehicle up-down direction so that the bottom face portion is mounted on the holding portion.

* * * * *